_United States Patent_ [19]

Woodhead

[11] 3,876,731

[45] Apr. 8, 1975

[54] POLYMERIZATION PROCESS FOR THE PRODUCTION OF TOUGHENED VINYL AROMATIC POLYMERS

[75] Inventor: David Allinson Woodhead, Amberley near Stroud, England

[73] Assignee: BP Chemicals Limited, London, England

[22] Filed: Oct. 7, 1971

[21] Appl. No.: 187,557

[30] Foreign Application Priority Data
Oct. 19, 1970  United Kingdom............... 49548/70

[52] U.S. Cl.......................... 260/880 R; 260/93.5 W
[51] Int. Cl. ...... C08f 19/06; C08f 19/08; C08f 1/11
[58] Field of Search ................................ 260/880 R

[56] References Cited
UNITED STATES PATENTS
3,047,534  7/1962  Dyer et al........................... 260/880

3,551,523  12/1970  Killoran .............................. 260/880
3,660,325  5/1972  Bremner ............................. 260/880
3,696,172  10/1972  Kaiho et al. ........................ 260/880

_Primary Examiner_—James A. Seidleck
_Attorney, Agent, or Firm_—Morgan, Finnegan, Durham & Pine

[57] ABSTRACT

Toughened polyvinyl aromatic polymers are produced by polymerising a solution of reinforcing rubber in vinyl aromatic monomer to phase inversion, dispersing the resulting prepolymer with an anionic surfactant and trisodium phosphate and suspending with a sparingly soluble phosphate before continuing the polymerisation.

6 Claims, No Drawings

POLYMERIZATION PROCESS FOR THE PRODUCTION OF TOUGHENED VINYL AROMATIC POLYMERS

This invention relates to the production of vinyl aromatic polymers. It particularly relates to the production of rubber reinforced vinyl aromatic polymers.

Processes for the polymerization of vinyl compounds as stable aqueous suspensions are known. Such process generally employ suspending agents to maintain the stability of the dispersed phase and prevent its agglomeration as polymerisation proceeds. It is also customary to employ monomer-soluble free radical initiators.

In the production of a rubber reinforced vinyl aromatic polymer by polymerising a solution of the rubber in monomer two stages are involved. In the fist stage the solution of rubber in monomer is polymerised and agitated to yield a dispersion of rubber solution droplets in a liquid phase which consists of vinyl aromatic polymer dissolved in monomer. In the second the remainder of the monomer is polymerised. In the first stage shearing action is applied to the polymerisation medium to cause the initial dispersion of vinyl aromatic polymer in rubber solution to phase invert to give the desired dispersion of rubber solution in vinyl aromatic polymer solution. In the second stage however shearing action can be detrimental and it is convenient to carry out this stage in aqueous suspension by suspending the first stage product in the form of small beads in an aqueous medium.

In order to form a stable suspension of the first stage product in water, it is necessary first to disperse the first stage product into dropielts which may then be stabilised by a conventional suspension stabiliser. As the first stage product comprises a polymer solution which is usually very viscous the dispersion of the first stage product can present problems.

A desirable suspending agent for use in polymerisation systems is a finely divided sparingly soluble inorganic phosphate. Such a suspending agent is conventionally employed with an anionic surfactant as an extender. Such suspending agents are cheap and minimise reactor fouling and the formation of emulsion polymer, which are problems encountered when the organic suspending agents of the protective colloid type such as polyvinyl alcohol and hydroxyethylcellulose are employed. The use of such inorganic suspending agents also gives good control of product bead size distribution and a clean effluent. However it is not usually possible to suspend a viscous first stage product by adding an inorganic phosphate suspending agent alone. It is normal to add a proportion of an organic protective colloid such as polyvinyl alcohol to assist the dispersion (such a process is described in BP 948,747 to Cosden), but such systems suffer albeit to a lesser extent from the problems associated with the use of organic suspending agents.

It is an object of the present invention to provide an improved suspension process for the production of toughened vinyl aromatic polymers.

Accordingly the present invention is a process for the production of a toughened vinyl aromatic polymer which comprises in a first stage polymerising a solution of a reinforcing rubber in a vinyl aromatic monomer until phase inversion has occured, dispersing the first stage product and residual monomer so produced in water in the presence of a surfactant and trialkali metal orthophosphate, precipitating a finely divided substantially insoluble inorganic phosphate suspending agent and continuing the polymerisation under suspension polymerisation conditions to produce a toughened vinyl aromatic polymer.

Conventional reinforcing rubber can be used. Examples are styrene/butadiene copolymers and polybutadienes, preferably polybutadienes having a cis 1,4 content of at least 30% wt. Suitably the rubber can be employed in conventional amounts i.e. from 0.5 to 20% wt of the monomer present. It is most desirable that the rubber should be free of any residual emulsifier surfactant. If surfactant is present the amount of surfactant added to the polymerisation system must be correspondingly reduced. However as the residual levels in the rubber are often variable and may be higher than desired in any case, it is preferred to use a rubber free of surfactant.

Any suitable vinyl aromatic monomer may be used but the preferred monomer is styrene.

Water may be present during the first stage polymerisation or may be added at any time before the first stage product is broken down into suspension size droplets (usually in the range 100 to 200 $\mu$). Suitably from 50 – 300, preferably 80 – 120 parts per 100 parts wt of rubber solution are employed.

When water is present during the first stage polymerisation it is often found advantageous to add a quantity of surfactant and trialkali metal orthophosphate at this stage as this tends to reduce fouling of the reactor walls. The amount added must not however be sufficient to disperse the first stage polymer into droplets which are too small to be sheared as this will prevent phase inversion occuring. Suitably from 0.0010 to 0.10 parts surfactant and from 0.05 to 0.25 parts of orthophosphate are used per hundred parts monomer (all parts are by weight) at this stage.

After phase inversion has taken place shearing may be continued for some time to obtain a good rubber particle size distribution. The rubber particle size in the polymer is suitably in the range 1 to 20 microns. The properties of the final toughened polyvinyl aromatic compound depend, inter alia on the average size and distribution of the rubber particles within this range. For example, polymers giving products with good gloss characteristics often have rubber particle sizes in the range 2 to 4 microns and compositions giving polymers with good matt surfaces often have rubber particle sizes in the range 10 to 20 microns. Control of rubber particle size may be effected by regulating the shearing of the first stage polymer both before and after phase inversion, suitably by adjusting the physical agitation. Increased agitation results in smaller particle size. An increase may be brought about either by increasing the agitator speed or by lengthening the time of the first stage. Use of controlled quantities of a high grafting and a low grafting initiator such as benzoyl and lauroyl peroxide will also help to control the rubber particle size. The more the grafting the smaller the particle size.

The first stage product and residual monomer is suitably dispersed in water and broken up into suspension sized droplets by mechanical agitation with water in the presence of the surfactant and the trialkali metal orthophosphate. Preferably an anionic surfactant is used. Any anionic surfactant conventionally employed as an extender for sparingly soluble inorganic phosphate suspending agent is suitable. Examples are sodium alkyl phosphates such as sodium nonyl phosphate and sodium alkyl aryl sulphonates such as sodium dodecyl benzene sulphonate.

The preferred trialkali metal orthophosphate is sodium orthophosphate.

The quantity of surfactant and orthophosphate employed should be sufficient to allow the mechanical agitation used to break the first stage product and residual monomer into suspension sized droplets and disperse it in water. Suitably 0.025 to 0.30 preferably 0.05 to 0.25 parts of surfactant are used per 100 parts monomer and 0.25 to 5 preferably 0.5 to 1.0 parts phosphate are used. The exact amount will depend on the particular reaction vessel and system used. It is found that this system can under suitable conditions allow normal agitation equipment to disperse products of viscosity up to 500 poise. If too little surfactant is added it will not be possible to suspend the first stage product. Too much can cause reactor fouling and suspension instability.

When the first stage product has been broken down into suspension sized droplets the substantially insoluble inorganic phosphate suspending agent may be precipitated. This may be conveniently carried out by adding a water soluble salt of a metal whose phosphate is a substantially insoluble suspending agent. The state of division of the sparingly soluble phosphate is suitably controlled by adjusting the pH value of the aqueous phase during precipitation.

A preferred sparingly soluble phosphate suspending agent is finely divided calcium hydroxy apatite which may be prepared by adjusting the pH of the aqueous phase from 5 to 7 suitably by adding disodium hydrogen phosphate and precipitating the hydroxy apatite with a soluble calcium salt such as calcium chloride or calcium nitrate.

If insufficient suspending agent is present to stabilise the suspension fully preformed suspending agent may be added. The total quantity of suspending agent present is suitably in the range 0.1 to 2.0 parts.

Polymerisation may then be completed under conventional conditions for the suspension polymerisation of toughened vinyl aromatic polymers i.e. polymerisation temperatures up to 150°C preferably with one or more free radical polymerisation initiators.

The invention is illustrated by the following examples of which Example 3 is a comparative test.

EXAMPLE 1

A solution of styrene monomer (96 parts by weight), general purpose polystyrene (4 parts) and an emulsifier-free polybutadiene (8 parts) was mixed with water (100 parts) in a stirred autoclave at 90°C. Benzoyl peroxide (0.04 parts) and two incremental quantities of lauroyl peroxide (0.06 parts and 0.05 parts) were added and the mixture stirred until a suitable rubber phase dispersion had been obtained (i.e. phase inversion had taken place) whence white mineral oil (4 parts) and butyl stearate (2 parts) were added. The viscosity of the product at this point was measured as 19 poise at 20°C.

At this point of time a 1 per cent solution of sodium nonyl phosphate in water (1.0 parts) was added followed immediately by trisodium orthophosphate dodecahydrate (0.67 parts) and disodium hydrogen phosphate dodecahydrate (0.43 parts). This caused the first stage product to disperse into unstable droplets in water within 3 minutes. The droplets were stabilised by precipitation of calcium hydroxy phosphate, by the addition of calcium nitrate tetrahydrate (1.27 parts).

Stearic acid (0.10 parts), tertiary butyl perbenzoate (0.20 parts) and benzoyl peroxide (0.15 parts) were added and polymerisation completed by gradually increasing the autoclave temperature to 140°C.

The polymer was recovered as individual beads having the following bead size distribution:

| BS Mesh No. | Fraction on mesh |
| --- | --- |
| 10 | 1 % |
| 22 | 5 % |
| 30 | 68 % |
| 44 | 18 % |
| 60 | 4 % |
| 85 | 2.5% |
| 100 | 0.5% |
| >100 | 1 % |

EXAMPLE 2

Example 1 was repeated using styrene monomer (94 parts), general purpose polystyrene (6 parts) and emulsifier-free polybutadiene (12 parts). Benzoyl peroxide (0.04 parts) and two incremental quantities of lauroyl peroxide (0.08 parts and 0.05 parts) were added to give eventually a first stage product of viscosity 260 poise at 25°C. This product was suspended as in Example 1.

The polymer was recovered as larger beads having the following bead size distribution:

| BS Mesh No. | Fraction on mesh |
| --- | --- |
| 10 | 38.5% |
| 22 | 53.0% |
| 30 | 4.5% |
| 44 | 2.5% |
| 60 | 1.5% |
| 85 | trace |
| 100 | trace |
| >100 | trace |

COMPARATIVE EXAMPLE 3

A polymerisation was carried out with a different order of addition of the suspending agent components to that used in Examples 1 and 2. The first stage product was as in Example 1. After the addition of white mineral oil (4 parts) and butyl stearate (2 parts), trisodium phosphate dodecahydrate (0.67) parts and disodium hydrogen phosphate dodecahydrate (0.43 parts) were added. No breakdown of the first stage product was observed. Calcium nitrate (1.0 parts) was added without affect on the dispersion. On addition of 1 per cent sodium nonyl phosphate solution (1.0 parts) the first stage product broke down to large unstable beads about 1 to 5 mm in diameter. This dispersion persisted for only a short time before collapsing early on during the suspension polymerisation cycle.

This order of addition of the suspending agent components is that commonly and successfully used with styrene monomer alone.

EXAMPLE 4

A solution comprising styrene monomer (96 parts), general purpose polystyrene (4 parts) and emulsifier-free-polybutadiene (8 parts) was mixed with water (33.3 parts) in a stirred autoclave at 90°C. A 10 per cent solution in water of a commercial surfactant Nansa SL30, (sodium dodecyl benzene sulphonate) (0.1 parts), and trisodium phosphate dodecahydrate (0.17 parts) were added causing the rubber solution to form a very unstable, large drop size dispersion in the water. By this means the rubber solution could be stirred without depositing a stationary boundary layer on the autoclave walls. Benzoyl peroxide (0.06 parts) and lauroyl peroxide (0.08 parts) were added and the mixture was stirred at 90°C until phase inversion had occured and the desired rubber particle dispersion was obtained when butyl stearate (4 parts) was added followed by water (33.3 parts).

A further quantity of the 10 per cent solution of Nansa SL30 (0.27 parts) was added followed immediately by trisodium phosphate dodecahydrate (0.25 parts) and disodium hydrogen phosphate dodecahydrate (0.25 parts). This caused the first stage product to disperse as small unstable droplets which were stabilised by addition of further water (33.3 parts) and the calcium nitrate tetrahydrate (1.0 parts).

Polymerisation was completed as in Example 1.

The polymer was recovered as beads having the following distribution:

| BS Mesh No. | Fraction on mesh |
|---|---|
| 10 | — |
| 22 | 2 % |
| 30 | 50 % |
| 44 | 31.5% |
| 60 | 21 % |
| 85 | 4 % |
| 100 | 0.5% |
| >100 | trace |

1. A process for the production of a toughened vinyl aromatic polymer which process comprises polymerising in a first stage a solution of 0.5 to 20% wt on monomer of a butadiene or styrene/butadiene reinforcing rubber in a vinyl aromatic monomer until phase inversion has occurred and a rubber particle size in the range 1 to 20 microns is achieved, dispersing the first stage product and residual monomer so produced in 50 to 300 parts of water per 100 parts of rubber solution in the presence of 0.05 to 0.25 parts of a surfactant and 0.5 to 1.0 parts of a trialkali metal orthophosphate, precipitating a finely divided substantially insoluble inorganic phosphate suspending agent and continuing the polymerisation in suspension at a temperature up to 150°C to produce a toughened vinyl aromatic polymer.

2. A process for the production of a toughened vinyl aromatic polymer which process comprises polymerising in a first stage a solution of 0.5 to 20% wt on monomer of a butadiene or styrene/butadiene reinforcing rubber in a vinyl aromatic monomer until phase inversion has occurred and a rubber particle size in the range 1 to 20 microns is achieved, dispersing the first stage product and residual monomer so produced in 50 to 300 parts of water per 100 parts of rubber solution in the presence of 0.025 to 0.30 parts of a surfactant and 0.25 to 5 parts of a trialkali metal orthophosphate, precipitating a finely divided substantially insoluble inorganic phosphate suspending agent and continuing the polymerisation in suspension at a temperature up to 150°C to produce a toughened vinyl aromatic polymer.

3. A process according to claim 2 where from 0.5 to 20% wt on monomer of a polybutadiene having a cis 1,4 content of at least 30% wt is used as reinforcing rubber.

4. A process according to claim 2 where the surfactant is sodium nonyl phosphate or sodium dodecyl benzene sulphonate.

5. A process according to claim 2 where the trialkali metal orthophosphate is trisodium orthophosphate.

6. A process according to claim 2 where the vinyl aromatic monomer is styrene.

* * * * *